US011395092B2

(12) United States Patent
Beauford

(10) Patent No.: US 11,395,092 B2
(45) Date of Patent: Jul. 19, 2022

(54) DEVICE LOCATION VERIFICATION FOR UPDATED MAP DATA

(71) Applicant: HERE Global B.V., Eindhoven (NL)

(72) Inventor: Mike Beauford, Morton Grove, IL (US)

(73) Assignee: HERE Global B.V., Eindhoven (NL)

( * ) Notice: Subject to any disclaimer, the term of this patent is extended or adjusted under 35 U.S.C. 154(b) by 643 days.

(21) Appl. No.: 15/212,466

(22) Filed: Jul. 18, 2016

(65) Prior Publication Data

US 2018/0020324 A1    Jan. 18, 2018

(51) Int. Cl.
| | |
|---|---|
| *H04W 4/021* | (2018.01) |
| *H04W 4/02* | (2018.01) |
| *H04L 61/5007* | (2022.01) |
| *H04L 43/10* | (2022.01) |
| *H04L 43/0852* | (2022.01) |
| *H04L 43/16* | (2022.01) |
| *H04L 101/69* | (2022.01) |
| *H04L 101/668* | (2022.01) |

(52) U.S. Cl.
CPC ......... *H04W 4/021* (2013.01); *H04L 43/0852* (2013.01); *H04L 43/10* (2013.01); *H04L 43/16* (2013.01); *H04L 61/2007* (2013.01); *H04W 4/025* (2013.01); *H04L 61/609* (2013.01); *H04L 61/6068* (2013.01)

(58) Field of Classification Search
CPC ...... H04W 4/021; H04W 4/025; H04L 43/16; H04L 45/122
See application file for complete search history.

(56) References Cited

U.S. PATENT DOCUMENTS

| | | | |
|---|---|---|---|
| 2007/0241176 A1 | 10/2007 | Epstein et al. | |
| 2010/0292918 A1* | 11/2010 | Chen | G01C 21/3461 701/533 |
| 2011/0119637 A1 | 5/2011 | Tul et al. | |
| 2012/0246003 A1* | 9/2012 | Hart | G06Q 30/0241 705/14.57 |
| 2013/0174228 A1* | 7/2013 | Etchegoyen | H04W 12/08 726/4 |
| 2013/0188538 A1* | 7/2013 | Kainulainen | G01S 3/48 370/310 |
| 2014/0368601 A1* | 12/2014 | deCharms | H04W 4/021 348/14.02 |
| 2016/0358187 A1* | 12/2016 | Radocchia | G06Q 30/0185 |
| 2017/0006043 A1* | 1/2017 | Da | H04L 63/107 |

(Continued)

OTHER PUBLICATIONS

Diacle, A. "Facing the AML challenges and Seizing the Opportunities of bitcoin and the blockchain." pp. 1-33.

(Continued)

*Primary Examiner* — Muthuswamy G Manoharan
(74) *Attorney, Agent, or Firm* — Lempia Summerfield Katz LLC

(57) ABSTRACT

Systems and methods for verifying a device requesting map data is within an approved geographic boundary. The method includes receiving a request including a route hop count and a latency value calculated from the device to a network node. The route hop count and latency values are compared against threshold values. The device is determined to be within the approved geographic boundary based on the comparison.

18 Claims, 11 Drawing Sheets

(56) References Cited

U.S. PATENT DOCUMENTS

2017/0031874 A1* 2/2017 Boudville ............ H04L 61/305

OTHER PUBLICATIONS

Greenberg, A. (n.d.). Sep. 5, 2013, from http://www.forbes.com/sites/andygreenberg/2013/09/05/follow-the-bitcoins-how-we-got-busted-buying-drugs-on-silk-roads-black-market/#68227e2e89a8.
Leung, A. (Apr. 27, 2016). Stellar Offers Lumens to Bitcoin Holders, Except in Countries on US Sanctions List. Retrieved Jul. 18, 2016, from http://cointelegraph.com/news/stellar-offers-lumens-to-bitcoin-holders-except-in-countries-on-us-sanctions-list.

* cited by examiner

US 11,395,092 B2

DEVICE LOCATION VERIFICATION FOR UPDATED MAP DATA

FIELD

The following disclosure relates to navigation devices or services.

BACKGROUND

Navigation services may download or access map data in order to stay up to date regarding roadway or geographic features. For example, roads may be altered or temporarily closed. New points of interest may be added to a map. Traffic updates may be used to calculate routes or travel times. Navigation services may be compromised by inaccurate or outdated maps. Additionally, navigational services or devices may download or access new regions when travelling. Maintaining an updated map is vital for operation of a navigation device or service.

Map data may require geographic restrictions. For example, distributing map data to export controlled countries may be prohibited. Different geographic regions may have different regulatory schemes such as different taxes or requirements. Different geographic regions may have different pricing schemes for map data. A location of a device or application using or requesting map data may be unknown.

SUMMARY

In an embodiment, a method is provided for verifying a device requesting map data is within an approved geographic boundary. The method includes receiving a request from the device for map data, the request including a first route hop count and a first latency value calculated from the device to a first network node. The first route hop count and the first latency value are compared to a first threshold hop count and a first latency threshold. A location of the device and whether the device is within the approved geographic boundary is determined based on the comparison of the first route hop count and the first latency value.

In an embodiment, a system is provided for verifying a device is within an approved geographic boundary. A geographic database is configured to store map data. A receiving module is configured to receive a request from the device for the map data, the request including a route hop count and a latency value calculated from the device to a network node. A threshold identification module is configured to calculate a threshold hop count and a threshold latency value that correspond to the network node and the approved geographic boundary. A location verification module is configured to determine based on the rout hop count, the latency value, the threshold hop count, and the threshold latency value that the device is within the approved geographic boundary. A transmitting module is configured to transmit the map data to the device when the device is within the approved geographic boundary.

In an embodiment, a method for distributing map data is provided. The method includes generating a blockchain including a smart contract for map data, wherein the smart contract includes a condition that a device be within a geographic boundary. A transaction is received including a hop count value and a latency value calculated from the device to a network node of a plurality of network nodes. A validation is received of the transaction by the plurality of network nodes storing the blockchain. Whether the device is within the geographic boundary is determined based on the hop count value and the latency value. The map data is transmitted to the device.

In an embodiment, a method is provided for verifying a device requesting map data is within an approved geographic boundary. A first plurality of messages are transmitted to a network node. As second plurality of messages are received from the network node. A number of route hops are calculated. A latency value is calculated. A request for map data is transmitted including the number of route hops and latency value. Map data is received when the location of the device is verified.

BRIEF DESCRIPTION OF THE DRAWINGS

Exemplary embodiments of the present invention are described herein with reference to the following drawings.

DETAILED DESCRIPTION

Figure 1:
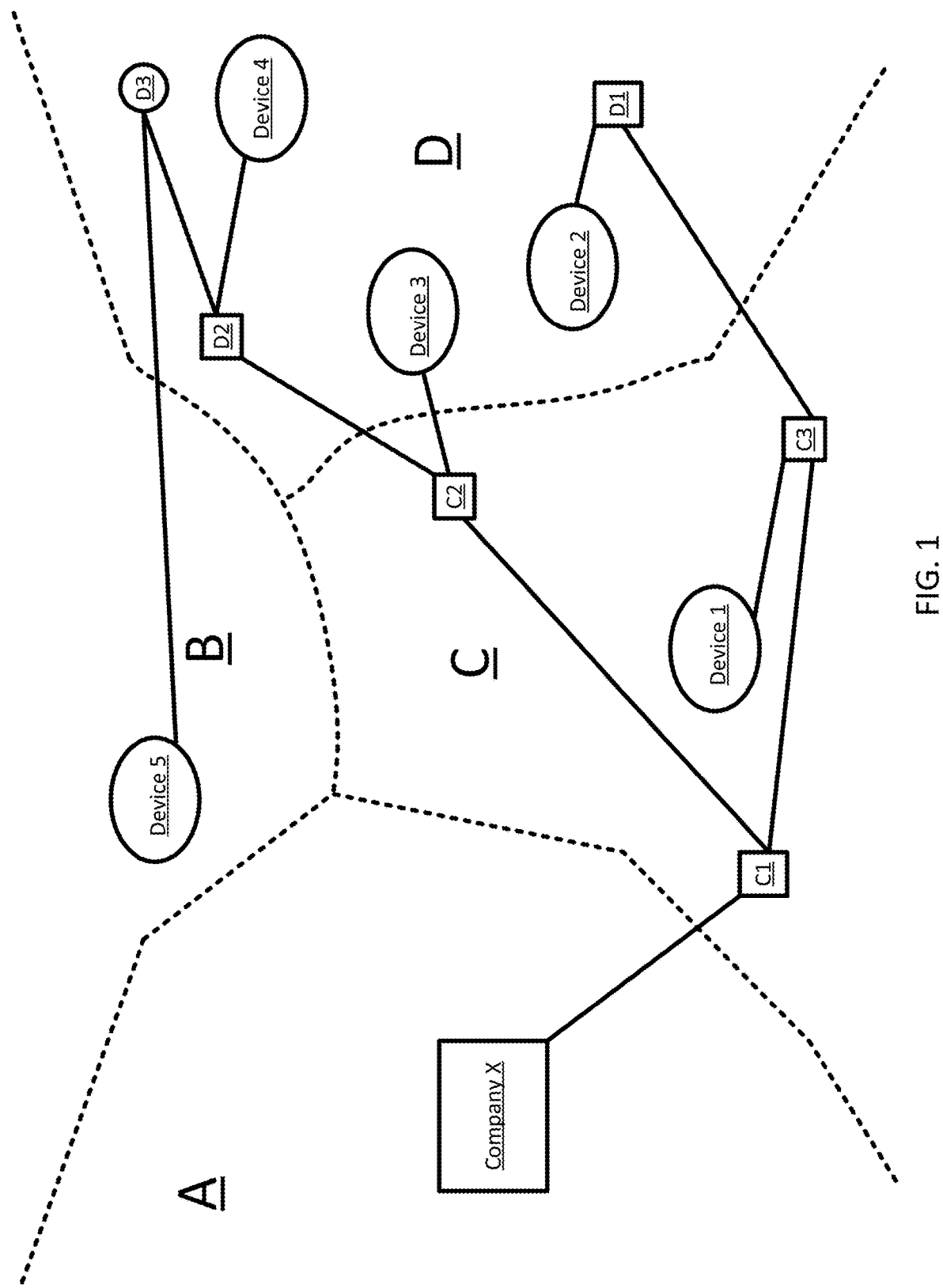
FIG. 1 illustrates an example map of a geographic region

FIG. 1 illustrates an example map of a geographic region. The example map illustrated has four different regions, A, B, C and D. Each of the different regions may represent a country (e.g., political region) or area with a different regulatory scheme. For this example, a company X may be located in region A. The company X would like to make services and products available in the other regions B, C, and D. Regions B, C, and D, however, may have different rules or regulations for services and products. The region B may be an export controlled country. Exporting certain types of technology may be prohibited or limited to an export controlled country. For example, the United States government may prohibit the export of map data or technology to a country on the export controlled list. The region C may prohibit certain types of data such as personal or private data from being distributed. For example, images of a private residence may be prohibited. The region D may allow all types of data to be distributed but may tax certain services (or apply tariffs) differently than regions A and C. A tariff is a tax or duty to be paid on a class of imports or exports. For a physical product, the tariff or tax might be applied when the product physically passes into the region. For a digital product or for data, there is no physical border. The Internet and other networks allow for digital products and services to skip over physical borders.

Company X may maintain multiple data centers or nodes in the different regions A, C, and D. Company X, located in region A, wishes to sell or provide services in regions other than where the company is located. Devices 1-5 may attempt to download data such as map data from the one or more data centers or network nodes (shown as C1, C2, C3, D1, D2, and D3). Depending on the network configuration (shown as the connections between Company X and the network nodes), each user or person or device may attempt to use the physically closest data center. For example, device 1 may use network node C3, device 2 may use network node C2, device 3 may use network node D1 and so on. Device 5, located in export controlled region B may attempt to access network node D2 by going through a port or node D3 in region D in order to appear to be in region D. Device 5 or any of the other users or devices accessing the system may be using a virtual private network (VPN) or proxy connection to hide their location. A VPN connection may be used to hide a device's location by forwarding all traffic through an alternative network. All traffic or requests appear to originate at the alternative network. When a device browses the web while connected to a VPN, the device contacts the website through the encrypted VPN connection. The VPN forwards the request for the device and forwards the response from the website back through the secure connection. If the device using a region C VPN to access a service, the service will see the connection as coming from within region C. VPNs may be used to hide a device's location in order to bypass geo-blocked resources. A proxy server or service acts generally the same way as a VPN. Proxy servers act as intermediary for requests from users or devices. In FIG. 1 the location of each of the devices is known. However, each of the persons or devices may attempt to use a VPN or Proxy connection to avoid the geographic restriction or taxes on services. Device 5 may appear as if the device is accessing the service in region D. A user of device 3 may elude taxes by accessing the service in region C and so on.

Embodiments described provide systems and methods to validate the geospatial location of a device so that map data will not be able to be sold or used in areas outside a geographic boundary. The map data thereby will be limited to a specific geographic area. Embodiments use values derived from a device and network node and supplied by the device to validate the request and check if the request conforms to contractual terms. The validation uses a combination of signed/time stamped values such as a network parameter value (e.g. a latency value and/or a number of route hops). The validity may be checked in real-time to validate the device. The download or request for map data may be denied or the map data rendered un-usable if the device travels outside of the GeoFence boundaries.

Figure 2:
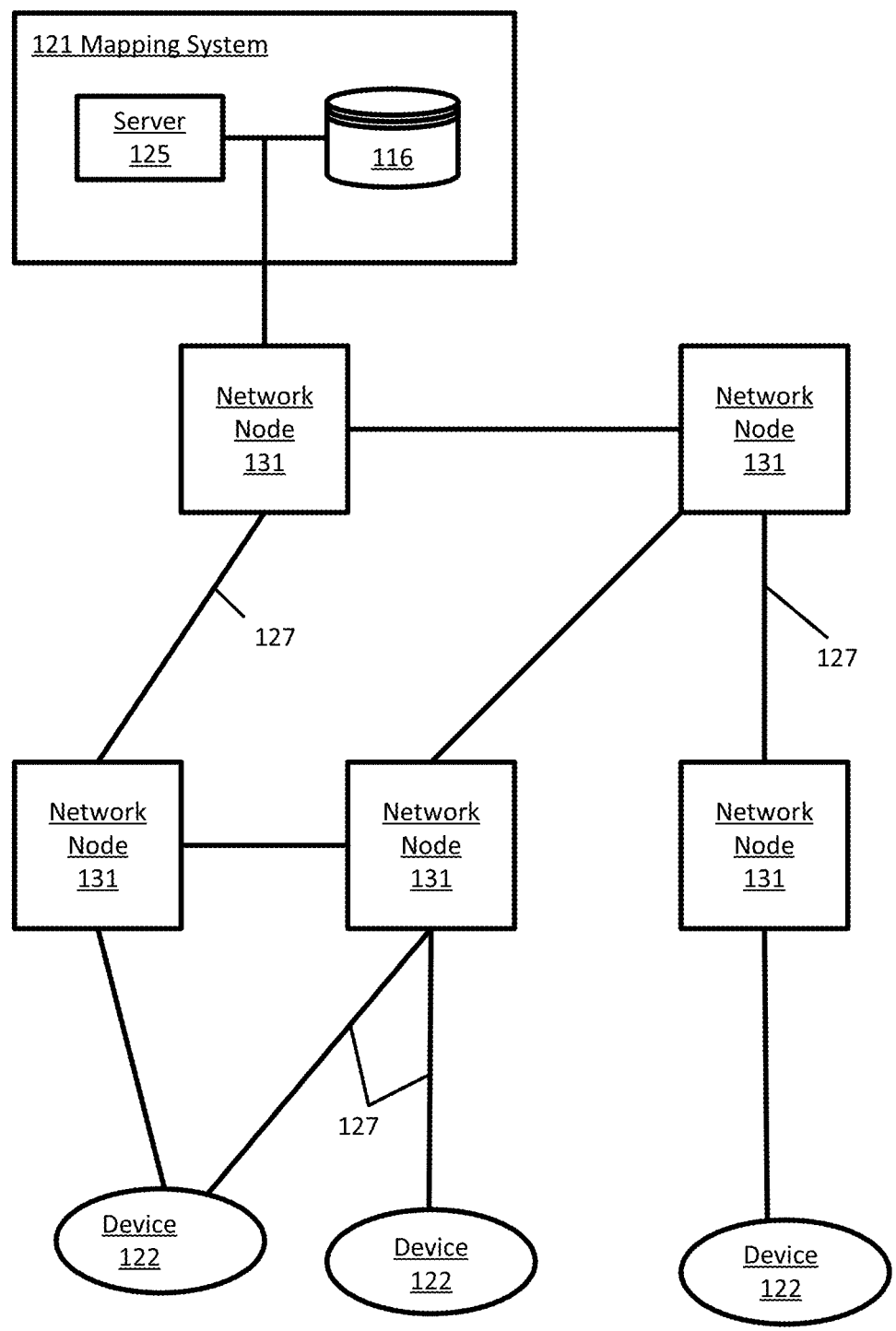
FIG. 2 illustrates an example system for validating the geo spatial location of a device.

FIG. 2 illustrates an example system for validating the geo spatial location of a device. FIG. 2 includes a mapping system 121 and one or more networks nodes 131. The mapping system 121 may include a database 116 (also referred to as a geographic database 116 or map database 116) and a server 125. The one or more network nodes 131 may replicate and/or distribute map data stored in the database 116 in the mapping system 121. One or more devices 122 may be connected to the one or more network nodes using a network 127. Additional, different, or fewer components may be included.

The mapping system 121 may include multiple servers, workstations, databases, and other machines connected together and maintained by a map developer. The mapping system 121 may be configured to validate a geospatial location for a device. The mapping system 121 may be configured to store data related to the network configuration such as routing and latency. The mapping system 121 may also be configured to generate routes or paths between two points (nodes) on a stored geographical map. The mapping system 121 may be configured to provide up to date map data or information to external geographic databases or mapping applications. The mapping system 121 may be configured to encode or decode map or geographic data.

In order to provide up to date navigation-related features and functions to the end user, the mapping system 121 uses the geographic database 116. The geographic database 116 includes information about one or more geographic regions. The geographic database 116 may include information for pedestrian areas, indoor areas, and outdoor areas among others. The geographic database 116 may be maintained by a content provider (e.g., a map developer). By way of example, the map developer may collect geographic data to generate and enhance the geographic database 116. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The geographic database 116 is connected to the server 125. The geographic database 116 and the data stored within the geographic database 116 may be licensed or delivered on-demand. Other navigational services or traffic server providers may access the traffic data and the map data stored in the geographic database 116. Map data or traffic data may be broadcast or distributed as a service.

The server 125 may be a host for a website or web service such as a mapping service and/or a navigation service. The mapping service may provide maps generated from the geographic data of the database 116, and the navigation service may generate routing or other directions from the geographic data of the database 116. The server 125 may provide map updates to existing maps. The mapping service may also provide information generated from attribute data included in the database 116. The server 125 may also provide historical, future, recent or current traffic conditions for the links, segments, paths, or routes using historical, recent, or real time collected data. The server 125 may be configured to analyze the network to determine the geo spatial location of a device and determine if any regulations apply for use of the map data. The server 125 may have a known physical location including, for example, a latitude value and a longitude value. The server 125 may store one or more common routing tables for the one or more network nodes 131.

The server 125 is connected to the network 127. The server 125 may receive or transmit data through the network 127. The server 125 may also transmit paths, routes, or map data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The network nodes 131 may be connected to the mapping system 121 and/or the server 125 through the network. In certain embodiments, the mapping system 121 or the server 125 may act as a network node 131 and vice versa. There may be multiple network nodes 131 in the system. Network nodes 131 may be configured to allow the server 125 or mapping system 121 to determine if a device or user of map data is within a specified geographic location. Network nodes 131 may have an identified physical location, for example, identifiable latitude and longitude points. Network nodes 131 may be configured to have a known hop count distance between the network node and other network nodes 131. Network nodes 131 may be connected to other network devices in the network such as routers, switches, or hubs that may exist between network nodes or between the one or more devices and the network nodes 131. The network nodes 131 may be configured to run software such as software for a distributed ledger or blockchain. The one or more network nodes may further be configured as distribution sites or intermediaries for passing along map data to the devices 122.

The one or more devices 122 may include smart phones, cell phones, personal navigation devices 122 or connected vehicles. The device 122 may include or store a copy of the geographic database 116 or a copy of a piece of the geographic database 116. The server 125 may communicate with the devices 122 through the network 127, network nodes 131 and other networks devices to update the map data on the device 122. The server 125 may also receive data from the device related to traffic or map events. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may run specialized application that provide navigational services using positional data and the geographic database 116. The devices 122 may also be integrated in or with a vehicle.

The one or more devices 122 may be configured to request map data from the server 125 or the mapping system 121. The location of the one or more devices 122 may be validated by a network node 131, the server 125, or the mapping system 121. The devices 122 may be configured to calculate a number of routing hops to reach a network node 131 and/or the server 125. The devices 122 may be configured to calculate a latency value for a round trip for a data packet from the device 122 to the server 125 or network node 131. The devices may be configured to store or hash the network parameter value such as a route hop count and latency value with a time stamp and send the value to the server 125 in order to validate the location of the device.

Figure 3:
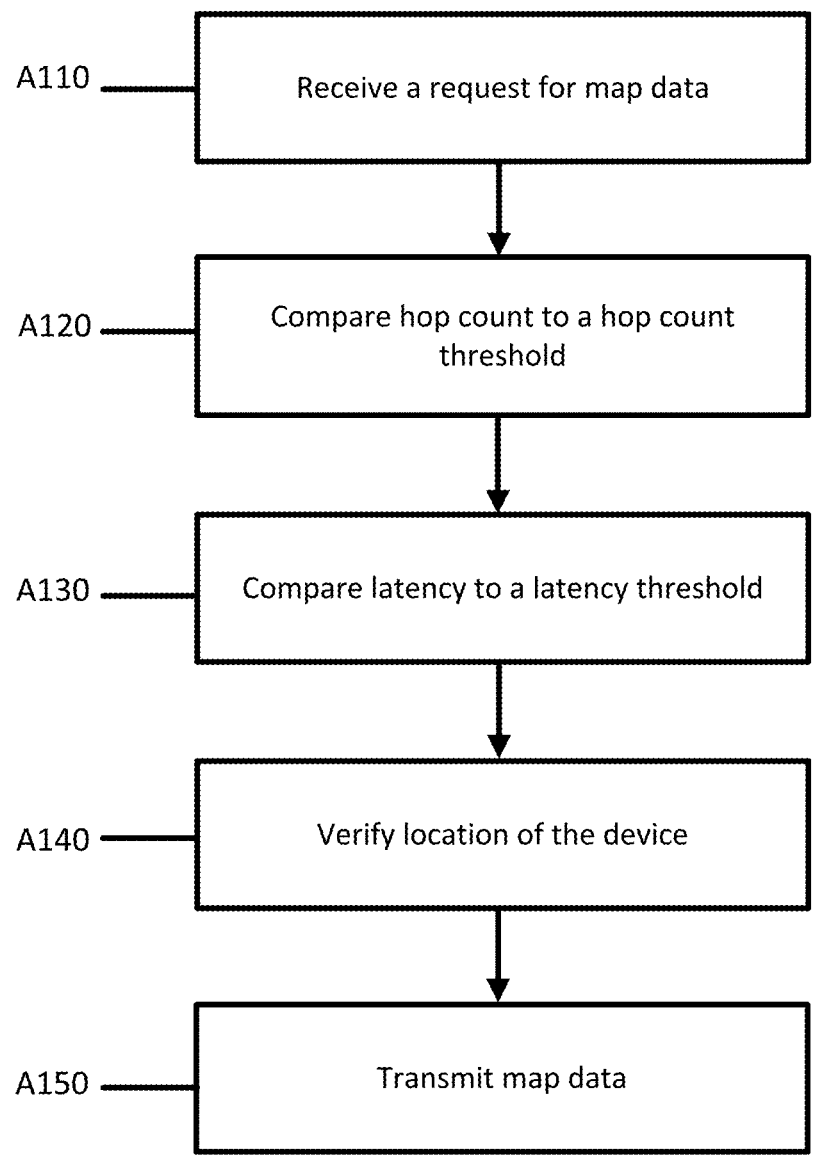
FIG. 3 illustrates an example flowchart for validating the geospatial location of a device.

FIG. 3 illustrates an example flowchart for providing a geo-fence for map data distribution. As presented in the following sections, the acts may be performed using any combination of the components indicated in FIG. 2, FIG. 7, or FIG. 10. The following acts may be performed by the server 125, the device 122, the mapping system 121, a network node 131, or a combination thereof. Additional, different, or fewer acts may be provided. The acts are performed in the order shown or other orders. The acts may also be repeated. Certain acts may be skipped.

At Act A110, a request is received from a device 122 for map data. Mapping services require up to date information in order to display accurate information. For example, the roadway network may change, buildings may be altered, businesses may leave or spring up among other changes. Navigation service require up to date information in order to provide accurate routing and/or accurate maneuvers. A roadway network may change temporarily due to construction or traffic conditions. Travel times or routing decisions may be altered due to traffic conditions, both current and historical. A device 122 may request map updates constantly as the day proceeds and traffic changes. A device 122 may request map updates when traveling in a different geographic region. Map updates may be requested and downloaded on a set schedule or on demand. A map update request may be transmitted over a network 127 to the server 125 or mapping system 121. Map updates may cost money, require an active subscription, or have other restrictions. Portions of map data may be restricted to certain countries or personal. Depending on a type of service contract, for example, certain map data may be provided freely or may incur a charge to the device.

Figure 4:
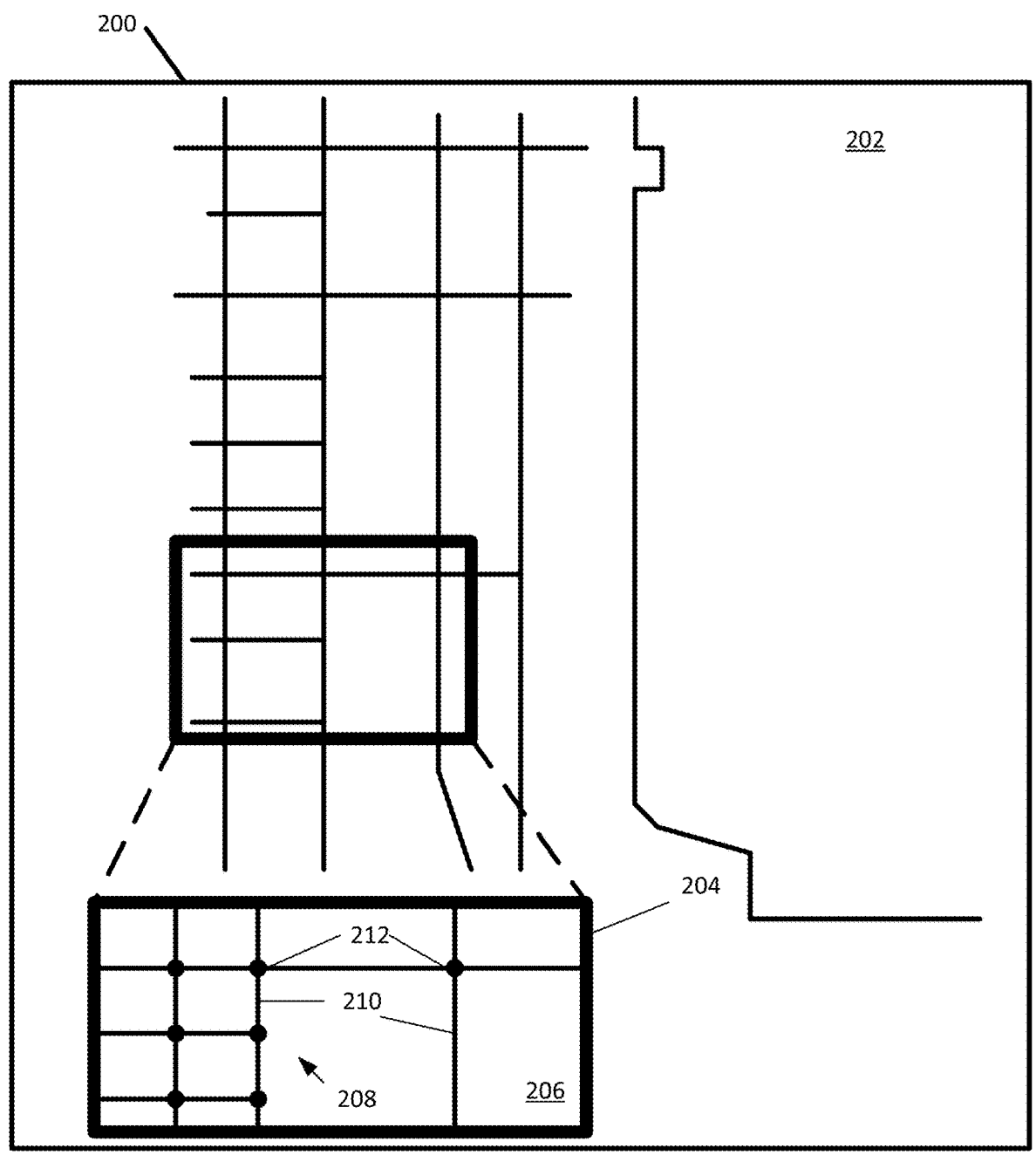
FIG. 4 illustrates a map of a geographic region.

Map data may include any type of map data such as data related to traffic or the road network. Different types of map data may be included in different levels of service or may be limited in certain regions. Map data may include new map data or updated map data for existing resources. Map data may include data relating to a specific geographic region or a portion of a geographic region. FIG. 4 illustrates a map of a geographic region 202. FIG. 4 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown associated with two nodes 212; one node represents the point at one end of the road segment and the other node represents the point at the other end of the road segment. The node 212 at either end of a road segment 210 may correspond to a location at which the road meets another road, i.e., an intersection, or where the road dead-ends. Each road segment 210 may include multiple sub-segments (or sub-links). A sub-segment may be a designated portion of the road segment 210. For example, a road segment 210 may be split into multiple sub-segments each 10 meters long.

Figure 5:
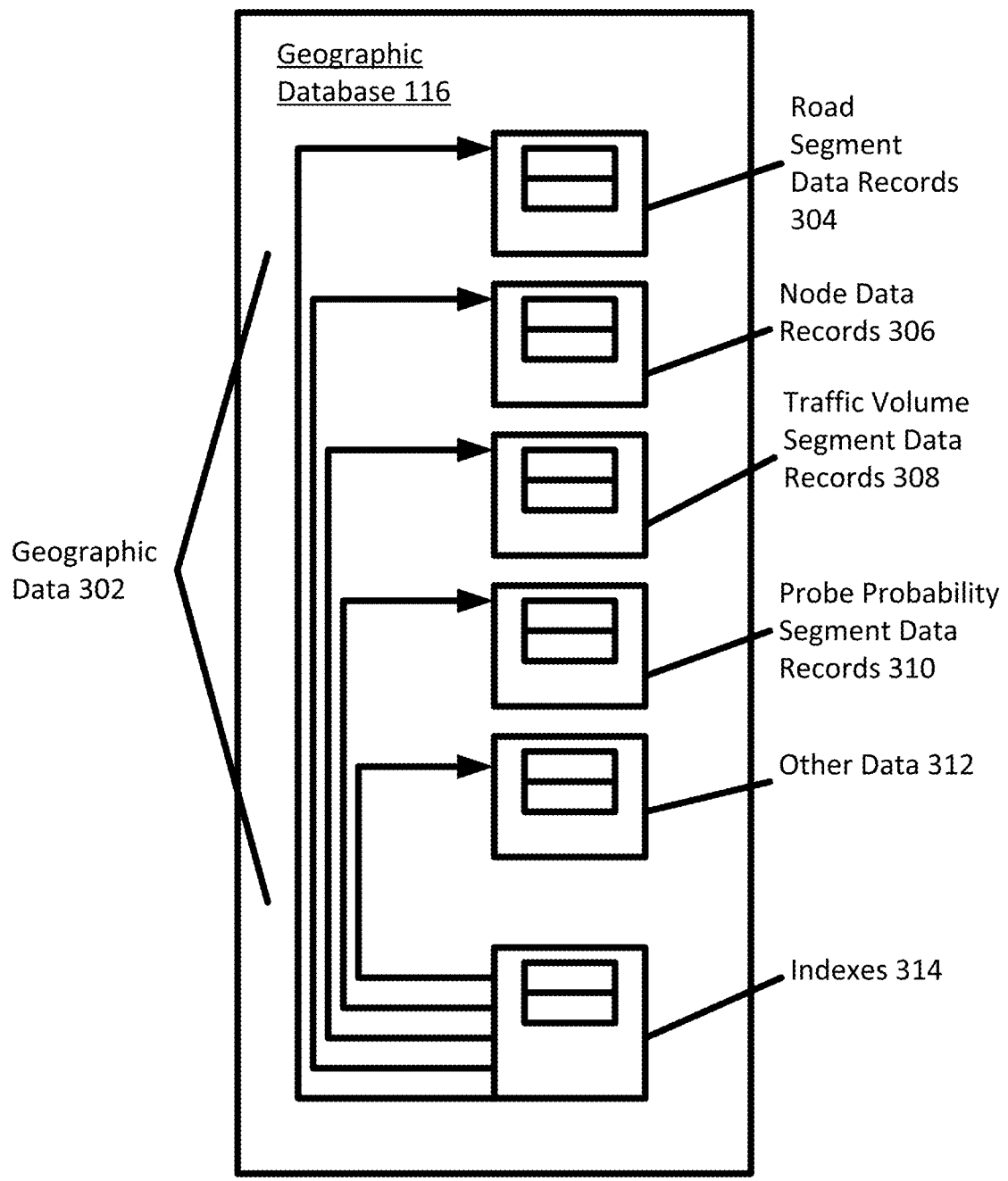
FIG. 5 illustrates the map data of FIG. 4 as stored in a database.

FIG. 5 illustrates the map data of FIG. 4 as stored in a database 116. In an embodiment, the geographic database 116 contains data 302 that represents some of the physical geographic features in the geographic region 202 depicted in FIG. 4. The data 302 contained in the geographic database 116 may include data that represent the road network 208. In the embodiment of FIGS. 4 and 5, the geographic database 116 that represents the geographic region 202 may contain at least one road segment database record 304 (also referred to as "entity" or "entry") for each road segment 210 in the geographic region 202. The geographic database 116 that represents the geographic region 202 may also include a node database record 306 (or "entity" or "entry") for each node 212 in the geographic region 202. The terms "nodes" and "segments" represent only one terminology for describing physical geographic features, and other terminology for describing features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records including a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

The road segment data record 304 may also include or be associated with other data that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes that correspond to intersections at the ends of the road portion represented by the road segment, the name or names by which the represented road segment is known, the street address ranges along the represented road segment, and so on.

Each of the types of data 302 may be updated as the map data changes over time. A device requesting data 302 may only require a portion, e.g. the updated parts, of the data 302. The data 302 may include restrictions on what data is available for different devices 122 or service plans. For example, base level data may be made freely available to each and every device. More complex or valuable data may be downloaded for a price. Updated data, for example, may only be accessible to devices 122 that maintain an active subscription. Different levels of subscriptions may have access to different types of data. The level of subscription required may be stored alongside the data records in the geographic database 116.

In certain embodiments, the request received from the device 122 is checked to see if the request is valid. For example, the server 125 may check to see if the device has an active subscription. The server 125 may check to see if the request from the device is valid under the active subscription. The server 125 may further check to see if all regulatory or taxing concerns have been met. For example, map data may be restricted from being downloaded in a certain region. Even though the device may have an active subscription, the geographic restrictions may invalidate the request. For geographic restrictions, the server 125 may request that the device identify or verify the location of the device. The server 125 may require that the device include data with the request that validates the location of the device.

In certain embodiments, a network parameter value such as a route hop count may be included with the request. A hop count refers to a number of intermediate devices (like routers or other network devices) through which data (packets) passes between a source and destination, rather than flowing directly over a single wire. Each router along the route constitutes a hop, as the data is moved from one network to another. Hop count is therefore a basic measurement of distance in a network. A hop count may be considered a rough measure of distance between two devices on a network. A hop count of X means that X routers or network devices separate the source host from the destination host. If for example, a data packet travels for source A to router B to router C to router D to destination E, the route hop count would be three, e.g. three devices between the source and destination.

A hop count may be calculated using a traceroute program or other method. A traceroute program outputs a list of traversed routers from a source to a destination. Each router or network device may then be counted. A traceroute program operates by sending packets to the destination with a gradually increasing time to live. The first packet may have a time to live (TTL) of one. This means that the packet will only travel to a first router or network device. The first router sends a reply failure message back to the source. By increasing the TTL, the traceroute program slowly uncovers a route (and number of hops) from the source to the destination.

In certain embodiments, multiple measurements for a hop count may be used. Certain routers or network devices may opt, at for example moments of increased traffic, to route packets via different or alternative routes. This type of load balancing may result in longer routes and therefore increased hop counts. The multiple hop counts may then be averaged to calculate an average hop count value. In an embodiment, only the lowest hop count value of the multiple hop count values may be used.

In certain embodiments, the route hop count may be calculated by the device. Once calculated, the route hop count may be hashed with a time stamp using a personal key and then transmitted to the server 125. The hash may further contain the results of the traceroute program such as the route used (names or identifiers of the network devices in the route).

In certain embodiments, other network parameter values may be included with the request such as a latency value. Latency may be a measurement of the time delay in sending data from a source to a destination. Latency may be measured either one-way or round trip. A one-way value represents the time from the source sending a packet to the destination receiving the packet. A round trip is the one-way latency from source to destination plus the one-way latency from the destination back to the source. Latency is affected by the medium over which data is transmitted, the routing and processing time, and any other delay such as delays due to congestion or throttling. A high latency may indicate either poor transmission or a lengthy distance. A device using, for example, a VPN connection may show high latency as a request first travels from the device to the VPN node and then to the network node (and back again. A similar device located next to the VPN node would potentially have a lower latency value to the same network node.

Latency may be calculated using a traceroute program, a ping program, or other method. In certain embodiments, the round trip latency is calculated by the device to one or more network nodes. The latency for each network node may be calculated multiple times and averaged. The calculated latency may be hashed with a time stamp using a persona key and then transmitted to the server 125.

Referring back to FIG. 3, at Act A120, the route hop count is compared to a threshold hop count. A threshold hop count may be related to the layout of the network. For example, the threshold may be based on an expected number of hops that would place the device outside of the geographic region. Identifying the layout of the network may allow the system to test for a maximum number of hops. An identified number of routers in a region may help identify the threshold. Tests may be run to identify a threshold hop count. Devices with a verified location (either through using personal or other methods) may be used to traceroute to each of the network nodes or the server. A graph or function may be derived from devices in a first region and devices in the second region. A graph of the devices in a first region may indicate the average number of hops and a distribution. For example, a first percentage of devices (e.g. twenty percent) take less than three hops. A second percentage takes less than five hops and so on. A final percentage takes more than eight hops to go from the source to the destination. A graph of the devices in the second region may indicate that a first percentage takes seven hops, a second percentage takes nine hops and so on. By comparing the two graphs, a threshold hop count may be identified. In the example here, a threshold of 7.5 hop counts may return a false positive of approximately twenty percent; e.g. twenty percent of the device in the proper region may not be validated and twenty percent of the devices not in the region may be validated erroneously. The threshold may be adjusted to capture more devices or to be stricter. A database of threshold hop counts may be stored in the server for each network node or servers if there are multiple nodes.

A threshold hop count may be different for different nodes or geographic regions. Different nodes, for example, may be physically located or located in the network closer to a different region. A network node that is, for example, only three hops away from a router that is at the edge of a geographic region may have a lower threshold than a network node that is seven hops away from the same router. As the network is altered or updated, the threshold hop count may be altered or updated.

For the comparison, there may different results. For example, for a simple comparison there may be three results. The route hop count may be lower, equal to, or greater than the threshold hop count. In certain embodiments, the comparison may generate a ratio value for the route hop count and the threshold hop count. Using, for example, a route hop count of six and a threshold hop count of ten, the ratio value may be calculated as 0.60.

At Act A130, the latency is compared to a threshold latency. Latency is a value that represents the time to send data (for example, a packet) from a source to a destination. For a route with no hops (i.e. a direct link between source and destination) and using the same medium and equipment, a larger latency corresponds to a larger distance between the source and destination. Due to different medium, routing techniques, and different equipment, this correlation may not always be true. For example, one bad link may drastically affect the entire calculation and make the latency appear to show that the device is far away. A small latency value, however is generally proof that a device is nearby in the network. A threshold latency may then be set to validate devices but not invalidate devices. In certain embodiments, the threshold latency may be set to a higher than normal level so that devices with a slow connection (bad transmission) are not invalidated. The latency comparison may return three results (e.g. less than, equal, greater than) or the comparison may return a ratio (calculated latency divided by threshold latency). The latency may also be combined with the threshold hop count to generate a value. Using a function, the latency may be weighted lower than the hop count if the geographic region has poor transmission lines. If the device captures each of the hops and the latency between the hops (for example, by using the traceroute program) certain individual latencies may be discarded to compute an alternative latency value that may be compared to the threshold latency.

At Act A140, the location, e.g. geo spatial location, of the device is validated. The location of the device 122 may be determined to be within an approved geographic boundary (also referred to as a GeoFence) based on the latency and route hop count. In certain embodiments, the device may include a location with the request. The server 125 may then verify that the location is correct. In other embodiments, the location of the device may be identified using the data sent with the request and the location then may be determined to be or not to be within the approved geographic boundary. The exact location of the device may not be determined, but only that the device is within a boundary related to the threshold hop counts and latency.

Figure 6:
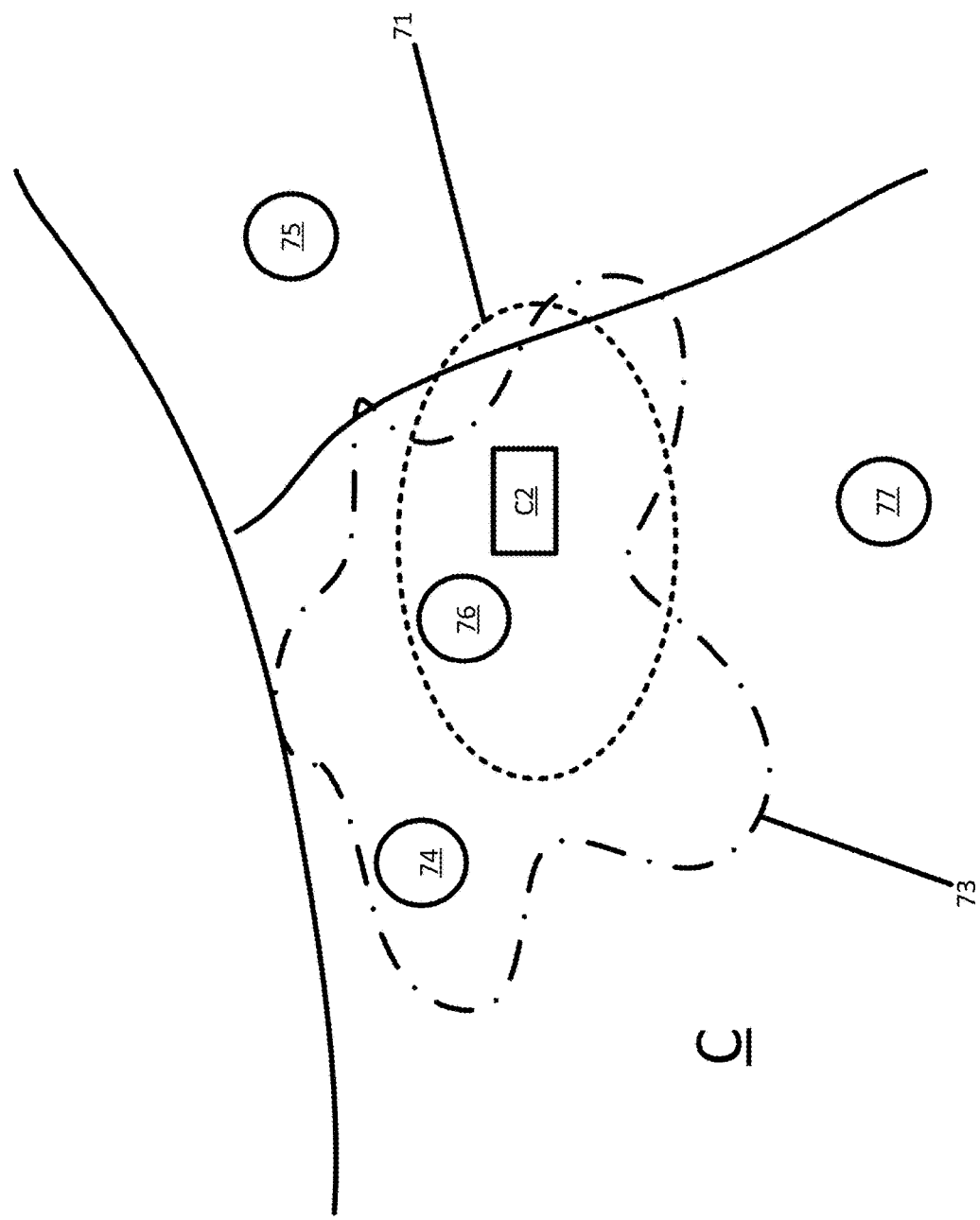
FIG. 6 illustrates a threshold hop count and a threshold latency for a network node.

FIG. 6 illustrates a threshold hop count and a threshold latency for a network node C2. FIG. 6 illustrates an example map of multiple geographic regions C and D. The network node C2 is located in the region C. The oval dotted line 71 is a visual representation of a latency threshold for the network node C2. Any device outside the latency threshold 71 may not be validated. Any device inside the threshold may be validated as being in region C. The dotted line 73 is a visual representation of a hop count threshold. Any device within the dotted line 73 may be validated as being in region C. There are portions of region D that are inside the thresholds due to the network configuration not following the geographic borders. Devices in these locations may be further validated or not validated by alternative methods or data. FIG. 6 depicts four devices 74, 75, 76, and 77 that are requesting map data from a server 125 using the network node C2. Devices 74, 76, and 77 are within geographic region C, device 75 is in geographic region D.

Device 76 is within both the latency threshold and the hop count threshold. Device 76 may calculate a latency and hop count to network node C2 and include the values in a request for map data. Since the values are below the thresholds, the server 125 may determine that device 76 is within a specified GeoFence (defined by the thresholds). As the GeoFence contains generally portions of region C, the server 125 may validate that device 76 is within region C.

Device 74 is within the hop count threshold, but not within the latency threshold. The server 125 may validate the location of device 74 based on the hop count alone or may require additional data.

Device 75 is not within the hop count threshold or the latency threshold. The hop count threshold and the latency threshold may have been set to exclude devices such as device 75 that are trying to access the network node from a different region (here region D). As such, any request from device 75 may be denied as the location is indeterminate. In certain embodiments, the server 125 may include different thresholds for network nodes for identifying devices in different regions. For example, if device 75 claims to be in region D, the threshold may be different that, for example, if device 75 is claiming to be in region C. With the thresholds shown, the server 125 may only be able to verify that device is not in region C.

Device 77 is not within the hop count threshold or the latency threshold. However, unlike device 75, device 77 is actually in region C. Device 77, however, is too far away on the network to be validated by a hop count or latency value from the device 77 to the network node C2. Device 77 may attempt to validate its location through other methods or by using a different network node.

In certain embodiments, multiple latencies and/or multiple hop counts may be used. In order to validate the geospatial location, the server may require hop counts and latency values from the device to multiple network nodes. The comparisons between the multiple hop counts and latency values to multiple network nodes may be cross referenced to determine if the values are plausible.

In certain embodiments, the comparisons to the thresholds may not be able to validate the geospatial location. Certain networks nodes near a geographic border may have difficulty distinguishing if a device is in one region or another.

If the measured hop count and latency values are close to the thresholds, additional data may be used to determine the geospatial location. Data such as the IP address or latitude/longitude information further be hashed and sent with the request.

In certain embodiments, the IP range of the device is further used to determine the geospatial location of the device. A device may access the network using an IP address. Each IP address may be stored in a database along with a location. Blocks of IP addresses are used by providers in certain regions. By identifying the range of the block, the provider and therefore the area may be identified using a geolocation database. Geolocation involves mapping an IP address to a country, region (city), latitude/longitude (lat/long), internet service provider (ISP) and domain name among other identifiers. Geolocation may not be precise, but the location information may be cross referenced with the hop count, traceroute data, and latency to validate from which a country if not a region or city a request is initiated from.

In certain embodiments, the latitude and longitude or GPS readings from the device may be used to verify the geospatial location. Many devices such as navigation devices use GPS or other positional systems to determine their location. The location data may be sent along with the request. The GPS data may be used as another check on the hop count and latency data generated above. The GPS data may also be used in the situation where the anchor node is located close to a geographic border and the thresholds may include some areas outside the geographic region. For a truthful request, the GPS data would indicate that the device was, for example, actually in the proper geographic region.

In certain embodiments, the map data requested may be used to verify the geospatial location. Map updates may occur for only a limited geographic region. For example, a device in Chicago may not need map updates for Los Angeles or London or Berlin. The map data requested may be checked against the other location data provided by the device such as the geographic region indicated by the route hop count and latency.

At act A150, the map data is transmitted to the device. Once the geospatial location is validated, the request may be filled by the server or a different network node. The map data, for example, may be distributed across multiple servers or network nodes. For regulatory or other reasons, the map data may be downloaded or transmitted by a server or network node in the same region as the device. If the device is not within an approved boundary, the server may lock the device or a mapping application on the device.

Figure 7:
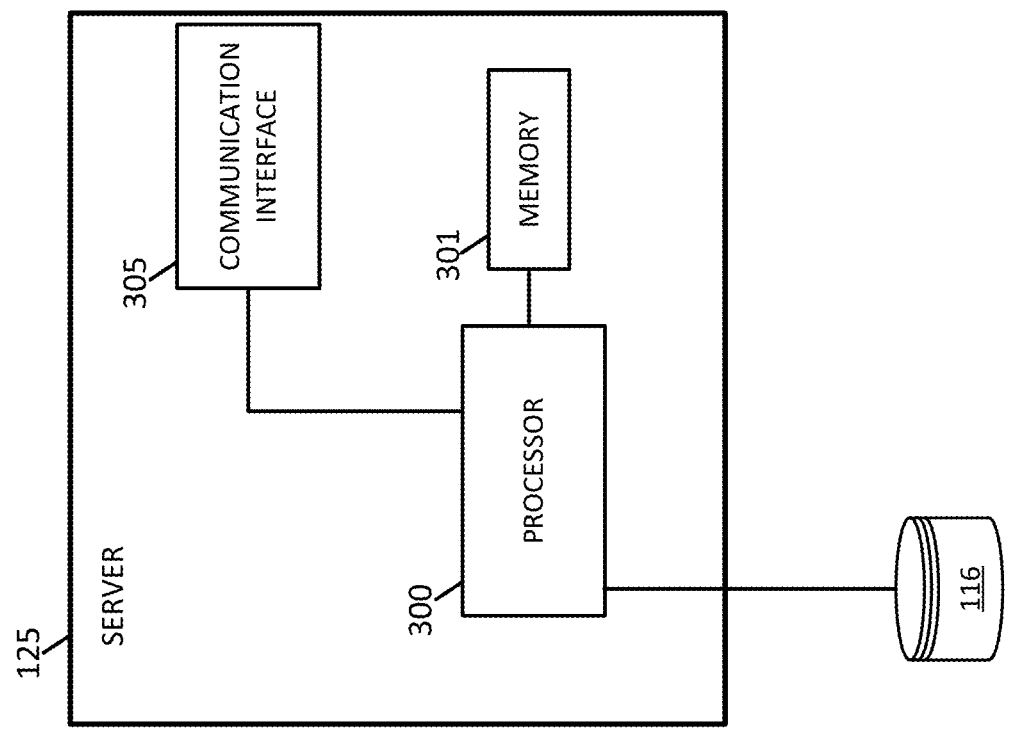
FIG. 7 illustrates an example server of the system of FIG. 2.

FIG. 7 illustrates an example server 125 of the system of FIG. 2. The server 125 includes a processor 300 that is connected to a communications interface 305 and a memory 301. The processor 300 is also connected to the database 116. The communications interface 305 is configured to receive requests from one or more devices 122 and transmit map data. The memory 301 is configured to store data relating to the network configuration and one or more network nodes. The processor 300 is configured to validate a geospatial location of a device. The processor 300 may be configured to determine a geographical region of a device and apply regulations and restrictions relating to the geographical region to services for the device. Additional, different, or fewer components may be included. For example, the database may include a geographic database configured to store map data. The communications interface 305 may include a receiving module configured to receive a request from the device for the map data. The communications interface 305 may further include a transmitting module configured to transmit the map data to the device when the device is within the approved geographic boundary. The processor 300 may include a threshold identification module configured to calculate a threshold hop count and a threshold latency value that correspond to the network node and the approved geographic boundary. The processor 300 may further include a location verification module configured to determine based on the rout hop count, the latency value, the threshold hop count, and the threshold latency value that the device is within the approved geographic boundary.

The communications interface 305 is a means for receiving requests from one or more devices 122 and means for transmitting map data. The communications interface 305 is a means for transmitting a command to lock a mapping application. The communications interface 305 is a means for receiving a transaction including a hop count value and a latency value calculated from the device. The communication interface 305 is a means for receiving a validation of the transaction by the plurality of network nodes storing the blockchain.

The memory 301 is a means for storing data relating to the network configuration and one or more network nodes. The memory 301 is a means for storing a geographic database.

The processor 300 is a means for comparing the route hop count to a threshold hop count and comparing the latency value to a latency threshold. The processor 300 is a means for determining whether the device is within the approved geographic boundary based on the comparison of the route hop count and the latency value. The processor 300 is a means for determining whether the device is within the approved geographic boundary based on an IP address. The processor 300 is a means for determining whether the device is within the approved geographic boundary based on positional data derived from a GPS unit. The processor 300 is a means for determining a threshold latency value and a threshold hop count. The processor 300 is a means for determining whether the device has an active subscription for the map data. The processor 300 is a means for generating a blockchain including a smart contract for map data.

In certain embodiments, there may be additional checks that may be passed before the map data is transmitted. For example, an additional check or condition may be that a service agreement requires payment for the update. Verifying the geographic location may be a condition. Once all the conditions have been met, the map data may be transmitted. Conditions may be checked on a one to one basis (e.g. just between the device and the server). The checks may also make use of a distributed ledger. In certain embodiments, the verification of a device's geospatial location is accomplished using a smart contract and a blockchain. A blockchain may include a plurality of nodes each using a client that runs a program that implements a smart contract platform. The blockchain may private or public. Using a distributed ledger increases the efficiency of the system and network. A distributed ledger further allows for map updates to be distributed in a trusted manner by multiple nodes.

A distributed ledger may be implemented using a similar system to the system depicted in FIG. 2. A difference is that for a distributed ledger system, each of the network nodes may be running a version of software that operates as a copy of the ledger. One or more of the network nodes may be designed an anchor node. An anchor node has features that allow the server to determine if a device is within geographically bounded areas. The server may create and/or deploy one or more anchor nodes (such as a virtual machine running blockchain software) in specific locations with a known latitude and longitude points. These deployment sites may have a specific hop count distance associated between the sites and other blockchain nodes on the network.

A blockchain is a type of distributed ledger that is used to record transaction across a network. A blockchain allows for each participant to alter the ledger in a secure way without the need for a central authority. Once a block of data is recorded on the blockchain ledger, the block is difficult to change or remove. When a device attempts to add to the blockchain, participants in the network all of whom have copies of the existing blockchain run algorithms to evaluate and verify the proposed transaction. If a majority of nodes agree that the transaction looks valid, e.g. identifying information matches the blockchain's history then the new transaction will be approved and a new block added to the chain. A consensus mechanism makes it difficult to alter records without controlling over 50% of the nodes. The consensus mechanism may be referred to as a proof of work, in which participants on the network run algorithms to confirm the digital signatures attached to blocks verify each transaction.

A transaction generated at a device and transmitted to a network node may attempt to alter the ledger data. After a transaction is executed on a network node, the result is a proposed modification of the ledger's data. Before committing the transaction to a networks node's ledger, the transaction is validated locally with other network nodes in the network. Approved transactions may then be packaged into a block and re-distributed to all the network nodes in the network, that re-validate to ensure their records match.

Figure 8:
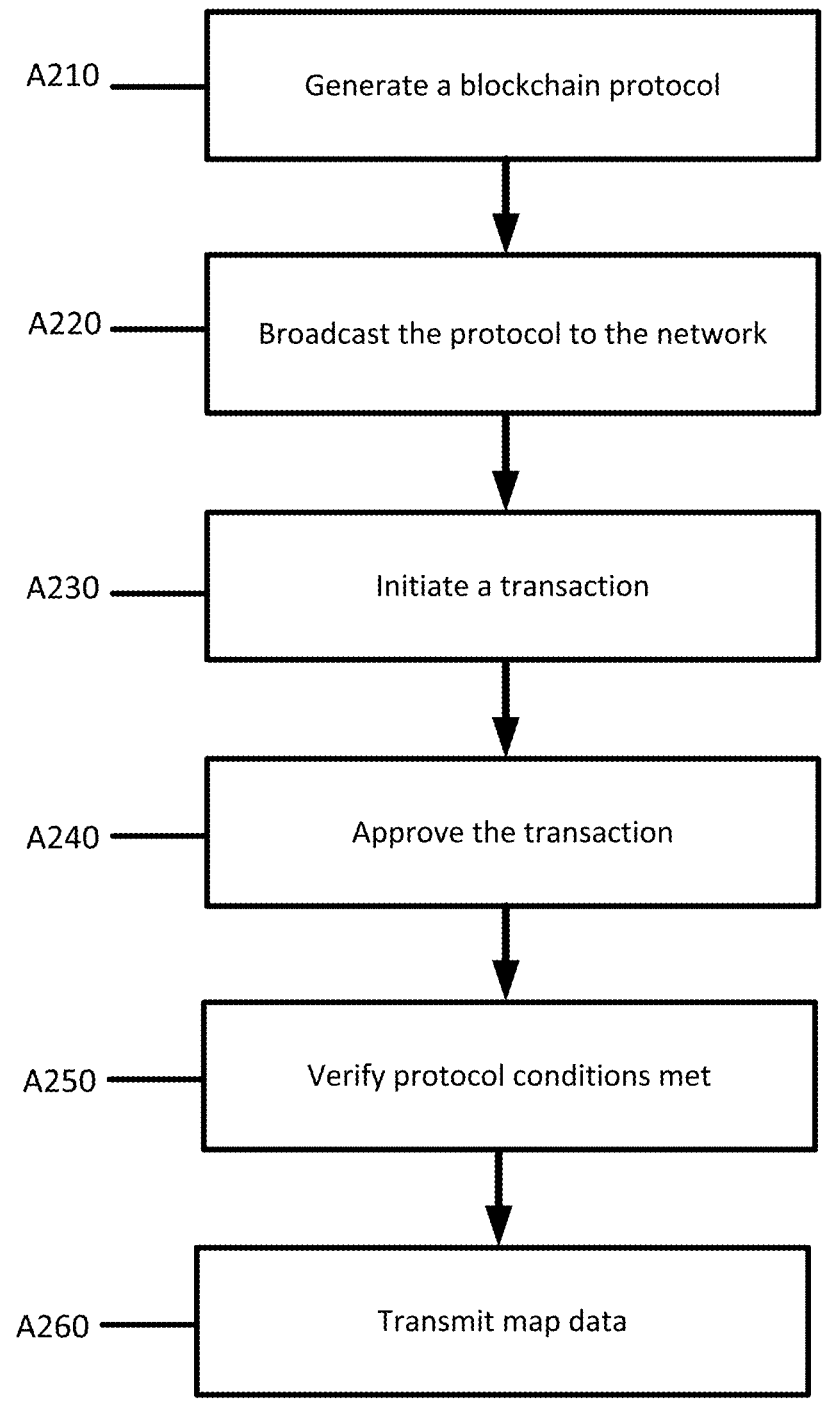
FIG. 8 illustrates an example flowchart for distributing map data to a device.

FIG. 8 illustrates an example method for distributing map data. As presented in the following sections, the acts may be performed using any combination of the components indicated in FIG. 2, FIG. 7, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

Figure 9:
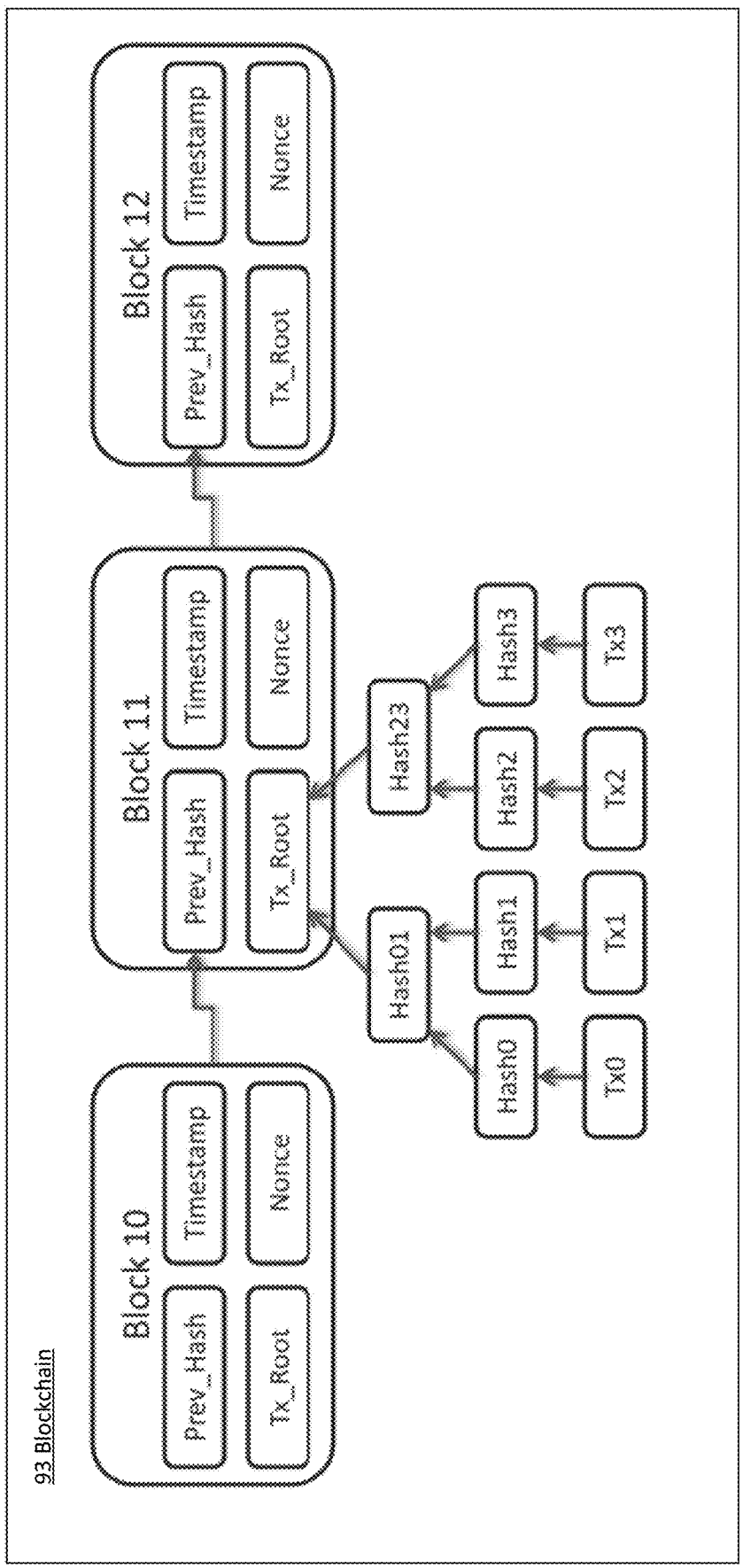
FIG. 9 illustrates an example blockchain.

At act A210, the server generates a blockchain protocol for negotiation to download map data. The protocol may include a smart contract. FIG. 9 illustrates an example blockchain 93. The blockchain 93 is made up of a series of blocks, block 10, block 11, and block 12. Each block is built on a hash of a previous block, linking all the blocks together. For example, block 11 is constructed using a hash (Prev_Hash) of block 10. Block 11 further contains a timestamp, Tx_Root (transactional data), and Nonce (a value that is used as a proof of work).

A portion of each block (e.g. the Tx_Root values in FIG. 9) may include code that enables a smart contract. As such, a smart contract is a piece of code that "lives/executes" within the blockchain on every node within the network. The smart contract is a compiled byte code (e.g. mini program) that is executed on each node. In order for the smart contract to be valid, all nodes within the blockchain agree (by majority vote) that the smart contract was executed and all the results agree before a transaction occurs. In certain embodiments, a smart contract may be generated for map data. In certain embodiments, the geo-spatial location verification may be used as part of the smart contract. In a typical blockchain, a user of a blockchain may be anonymous. As such, there is no way to verify a buyer, user, or downloader of map data or map services is within an approved geographic boundary or region. In order to verify that maps purchased within the blockchain network are used and reside in approved locations, the geospatial location of the device may be validated by including data in the smart contract related to, for example, the hop count and/or latency. A condition of the smart contract may be that the data, e.g. the hop count and latency, met a threshold set by the server. If the thresholds are exceeded, the server may not validate the transaction in the blockchain and therefore not transmit any map data requested to the device.

In certain embodiments, the blockchain may be based on Ethereum. For Ethereum's blockchain, the computation requires "gas" to compute the contract and has a defined final value and form, that then is transformed into a transaction on the blockchain. This "gas" cost money to run. There is a transaction cost in executing a contract including the contract intrinsic value. Once the geo-spatial location of the device is validated, the device or user pays the transaction cost and any cost required for the map data update (price set by the server, regional taxes, etc.). The contract now fulfilled, the map data is transmitted to the device or made available for download.

At act A220, the blockchain protocol is broadcast to a network. Using the blockchain software or code on each network node, the blockchain protocol is hosted at each site. Certain sites may only host a portion of the blockchain, for example only the most recent blocks and transactions.

At act A230, a transaction is initiated at a device. The device may be running a copy of the blockchain software. The device generates a transaction to be added to a new block. The transaction may include the device using a personal key to sign the protocol. In order to validate the protocol, the transaction may require that the device add additional data to the transaction such as a hop count or a latency value.

A hop count may be calculated by counting the number of network devices (e.g. routers) between the device and an anchor node. The anchor node is a network node with an identified physical location. For example, the anchor node may be identified as a machine running at a specific address (e.g. 1 N. State Street, Chicago Ill., USA) or at an identified latitude and longitude. The device may use a program such as traceroute to determine the network devices between itself and the anchor node. A high hop count may indicate that the device is not near the anchor node. For example, a hop count of 6 may indicate that the device is not in Chicago (using the anchor node above). A hop count of 10 may indicate that the device is not in Illinois. A hop count of 15 may indicate that the device is not in the USA.

A latency value may be calculated by measuring a round trip time from the device to the anchor node. Latency may be affected by distance (and type of transmission line), network devices, or networking techniques (load balancing for example). Latency may be measured using a program such as traceroute or ping.

Both the hop count and the latency may be hashed together with a timestamp and the respective anchor node that the hop count and latency were measured from. The hashed value may then be added to the transaction along with other identifying information such as the IP address of the device or GPS coordinates. Additional information or data may further be required by the protocol and added to the transaction by the device.

At act A240, a majority of nodes in the network approve the transaction and the transaction is added to the blockchain. Random nodes within network are used to generate the proof of work and create the next block in the chain. This means previous blockchain nodes are used to compute the new blockchain node. The new block is then added to the blockchain, that provides indelible and transparent proof the protocol is valid and is then accepted by all other nodes in the network.

At act A250, conditions in the transaction are checked by the server. The protocol may, for example, contain the following clause: if the device pays X amount to the server 125 and is located within an approved geographic area, the server 125 will make available the map update data. The conditions are 1) the payment and 2) the location of the device. The server 125 may check to make sure both conditions are met. The first by making sure the device either has an active subscription or has paid for the update. The second, by using the hop count and latency in the transaction to validate the geolocation of the device.

The hop count and latency value may be compared to respective thresholds. For example, the hop count may be compared to a hop count threshold of six. Using the above example of the anchor node located in Chicago, the server 125 may be able to tell if the device is in Chicago if the hop count is lower than six. Chicago, for example, may require an additional tax on map data services that then may be collected. The latency value may also be compared with a threshold value to determine the relative geo spatial location of the device in relation to the anchor node. The latency threshold may be an average latency for a geographic region. The server 125 may use additional information such as the IP address of the device or GPS data to determine if the geographic condition is met. If the conditions are met, the server 125 may make available the map data to the device.

Pseudo code to check the conditions may be similar to the code shown below.

```
Start:
    Parameter IP Address
    Parameter Hop Count
    Parameter Latency
    Parameter Transaction + Timestamp
    Parameter List Point(lat/lgn)
    Use Lookup table for IP Address -> GPS point;
    Use Lookup table for IP Address -> IP hop count;
    Use Lookup table for IP hop count range -> Avg Latency
    // This checks to see if hop counts are equal or under threshold.
    IF (IP Hop count <= Hop Count Lookup table)
        // This checks to see if the latency is within tolerance.
        IF (Latency <= Avg Latency)
            // This checks to see if the GPS point is within the GeoFence.
            IF (checkGeoFence (GPS Point, List Point(s)))
                Return True;
            Else
                Return False;
        Else
            Return False;
    Else
        Return False;
```

At act A260, the map data is transmitted from the server 125 to the device 122. The map data may be stored on the server 125 or in one or more of the network nodes. The map data may be encrypted until the protocol is approved for the device. For example, the device may download the data ahead of time and then receive a key from the server to decrypt the downloaded map data.

In an embodiment, mapping software may be required to verify its location and active subscription at multiple intervals. For example, in order to function, the mapping software may require a key as opposed to updated map data from the server. The mapping software may generate a transaction daily with conditions such as maintaining an active subscription and geographic location in return for the server 125 transmitting the key to the device.

Figure 10:
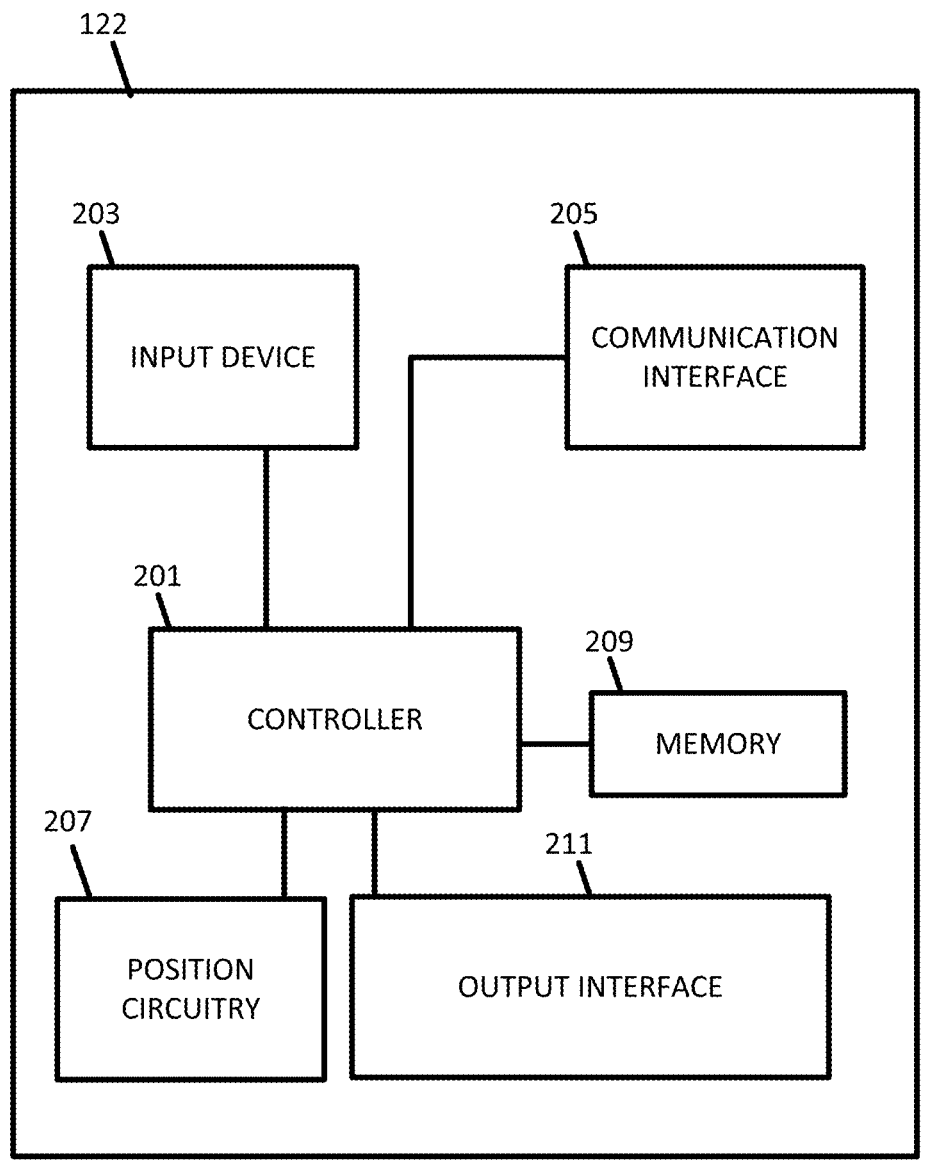
FIG. 10 illustrates an example device of the system of FIG. 2.

FIG. 10 illustrates an example device 122 of the system of FIG. 2. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, movement circuitry 208, and an output interface 211. The output interface 211 may present visual or non-visual information such as audio information. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle. The device may store map data in the memory 209.

The memory 209 and/or memory 301 may be a volatile memory or a non-volatile memory. The memory 209 and/or memory 301 may include one or more of a read only memory (ROM), random access memory (RAM), a flash memory, an electronic erasable program read only memory (EEPROM), or other type of memory. The memory 209 and/or memory 301 may be removable from the mobile device 122, such as a secure digital (SD) memory card. The memory may contain a locally stored geographic database or link node routing graph. The locally stored geographic database may be a copy of the geographic database 116 or may include a smaller piece. The locally stored geographic database may use the same formatting and scheme as the geographic database 116. The locally stored geographic database may be updated by downloading or accessing updated map data from the server or a network node.

A device 122 may be configured to identify a present location of the device or vehicle. The location may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

The location of a device may also be identified using positional circuitry such as GPS or other positional inputs. The positioning circuitry 207, which is an example of a positioning system, is configured to determine a geographic position of the device 122. The movement circuitry 208, which is an example a movement tracking system, is configured to determine movement of a device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203. The device 122 may identify its position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The device may be configured using the communications interface 205 to request map data from a server 125 relating to the location of the device or another inputted location. The device may automatically update the locally stored geographic database when new data is available. The server 125 may receive the request using the communications interface 305. The communication interface 205 and/or communication interface 305 may include any operable connection. The communications interface 305 may include a receiving module and a transmitting module. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver/transmitter for digital radio signals or other broadcast mediums. A receiver/transmitter may be externally located from the device 122 such as in or on a vehicle.

The communications interface 205 may be configured to transmit packets to one or more network nodes in order to determine a hop count or latency value. The communications interface 205 may transmit one or more packets to a network node and measure the total time from transmission to receiving a response (latency). The communications interface 205 may transmit one or more packets to a network node and detect which if any network devices are included in the route from the device to the network node.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing. The controller 200 may also include a decoder used to decode roadway messages and roadway locations.

Figure 11:
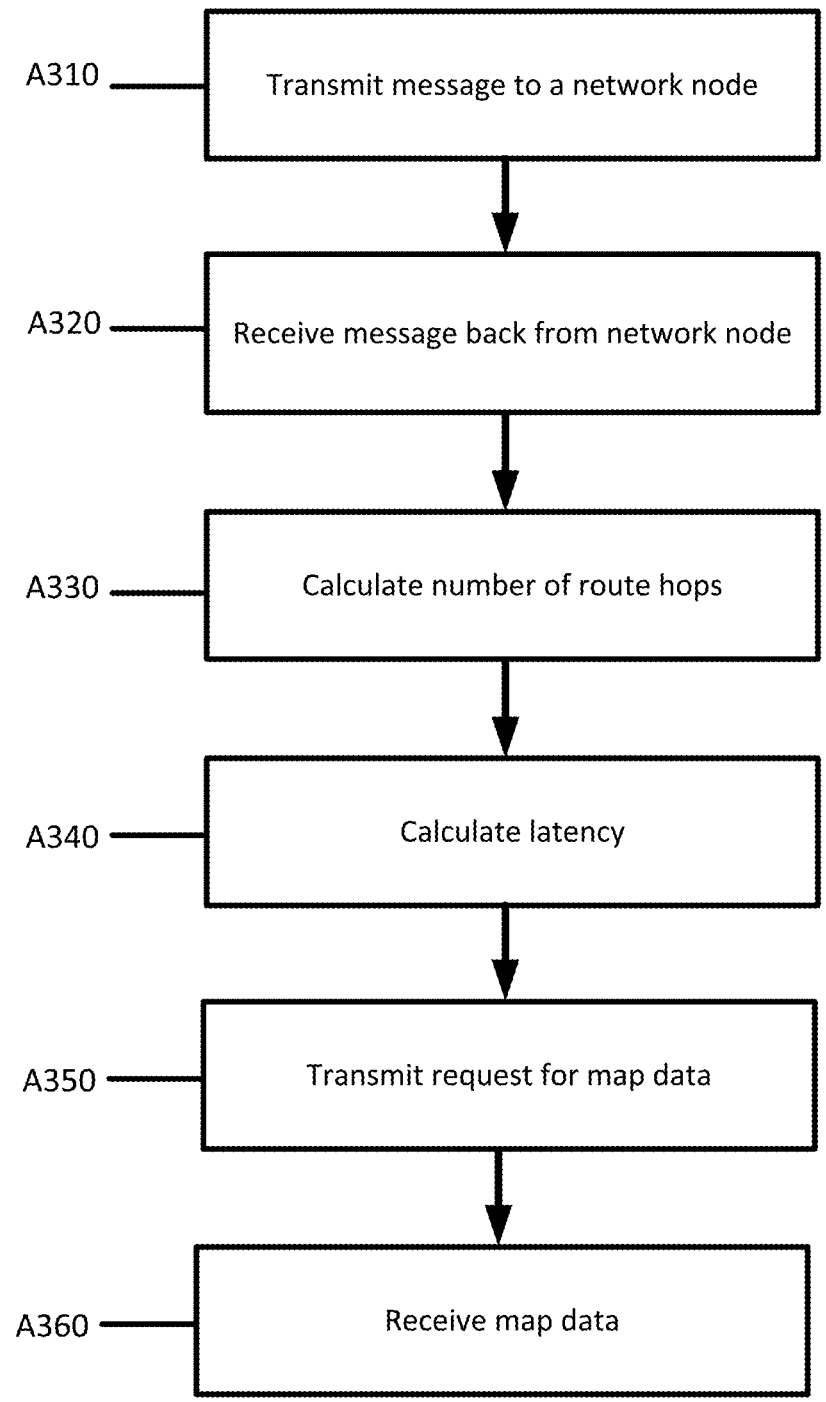
FIG. 11 illustrates an example flowchart for requesting map data by a device.

FIG. 11 illustrates an example flowchart for requesting map data by a device. As presented in the following sections, the acts may be performed using any combination of the components indicated in FIG. 2, FIG. 7, or FIG. 10. The following acts may be performed by the server 125, the device 122, the mapping system 121, a network node 131 or a combination thereof. Additional, different, or fewer acts may be provided. The acts are performed in the order shown or other orders. The acts may also be repeated. Certain acts may be skipped.

At act A310, the device transmits a plurality of messages to a network node. The network node has a known physical position. The plurality of message may include messages used in a traceroute program or command. Traceroute is a command that identifies the path or route a packet of information is routed from a source to a destination. Traceroute may also identify the network devices (e.g. routers) the packet passes through until the packet reaches the destination, or fails to and is discarded. In addition, traceroute may also identify how long each 'hop' from router to router takes.

The plurality of messages may also include one or more packets used in a ping program. A ping program may identify the amount of time (latency) the messages (packets) take to go from a source to a destination and back.

At act A320, the device receives a plurality of return messages from the network node. The return message may be used in the traceroute or ping program. The traceroute program operates by sending packets to the destination with a gradually increasing time to live. The first packet may have a time to live (TTL) of one. This means that the packet will only travel to a first router or network device. The first router sends a reply failure message back to the source. By increasing the TTL, the traceroute program slowly uncovers a route (and number of hops) from the source to the destination. For each transmitting message from A310, the device may receive a corresponding return message.

At act A330, the device calculates a route hop count from the plurality of message and plurality of return messages. The device may use a traceroute program to count the number of network devices between the device and the network node. For example, if a message traveling from a source to a destination passes through (routed) six devices, the hop count would be six. In certain embodiments, the device further records each of the different hops (e.g. identification of the routers).

At act A340, the device calculates a latency value from the plurality of message and plurality of return messages. The device may use a program such as traceroute or ping to calculate the latency from the device to the network node. Latency may be affected by the transmission medium. Multiple attempts may be made to calculate the latency to exclude any outlying results. The average latency value of multiple attempts may be used for the latency value.

At act A350, the device transmits a request message for map data to a server. The request message may include the identity of the network node, the route hop count, and the latency. The request message may further include additional data such as the IP address of the device or latitude and longitude derived from, for example, a GPS system on the device.

At act A360, the device receives map data from the server. The server may use the identity of the network node, the route hop count, and the latency to verify the location of the device. If the device is within an approved geographic area, the server may transmit or make available map data to the device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed.

Embodiment 1 a method for verifying a device requesting map data is within an approved geographic boundary, the method comprising: receiving, by a processor, a request from the device for map data, the request including a first route hop count and a first latency value calculated from the device to a first network node; comparing, by the processor, the first route hop count to a first threshold hop count; comparing, by the processor, the first latency value to a first latency threshold; and determining, by the processor, whether the device is within the approved geographic boundary based on the comparison of the first route hop count and the first latency value.

Embodiment 2 the method of embodiment 1, further comprising:
transmitting, after determining the device is within the approved geographic boundary, the map data to the device.

Embodiment 3 the method of embodiment 2, further comprising: determining whether the device has an active subscription for the map data, and transmitting the map data only when the device has an active subscription.

Embodiment 4 the method of embodiment 1, wherein the request further includes an IP address of the device; and wherein determining whether the device is within the approved geographic boundary is further based on the IP address.

Embodiment 5 the method of embodiment 1, wherein the request further includes positional data derived from a global positioning system (GPS) of the device; and wherein determining whether the device is within the approved geographic boundary is further based on the positional data.

Embodiment 6 the method of embodiment 1, wherein the request includes a second route hop count and a second latency value calculated from the device to a second network node; the second route hop count and second latency value are compared to a second threshold hop count and second latency value; and wherein determining whether the device is within the approved geographic boundary is further based on the comparisons of the second route hop count and the second latency value.

Embodiment 7 the method of embodiment 1, wherein the first threshold hop count is a minimum number of route hops from the first network node to a location outside the approved geographic boundary.

Embodiment 8 the method of embodiment 1, wherein when the device is determined to not be within the approved geographic boundary, the processor transmits a command to lock a mapping application on the device.

Embodiment 9 a system for verifying a device is within an approved geographic boundary, the system comprising: a geographic database configured to store map data; a receiving module configured to receive a request from the device for the map data, the request including a route hop count and a latency value calculated from the device to a network node; a threshold identification module configured to calculate a threshold hop count and a threshold latency value that correspond to the network node and the approved geographic boundary; a location verification module configured to determine based on the rout hop count, the latency value, the threshold hop count, and the threshold latency value that the device is within the approved geographic boundary; and a transmitting module configured to transmit the map data to the device when the device is within the approved geographic boundary.

Embodiment 10 the system of embodiment 9, further comprising: a subscription module configured to check if the device has an active subscription for the map data.

Embodiment 11 the system of embodiment 9, wherein the location verification module is further configured to determine that the device is within the approved geographic boundary based on an IP address for the device received by the receiving module.

Embodiment 12 the system of embodiment 9, wherein the latency value is an average latency value from the device to the network node.

Embodiment 13 the system of embodiment 9, wherein the location verification module is further configured to determine that the device is within the approved geographic boundary based on positional data derived from a global positioning system (GPS) of the device and received by the receiving module.

Embodiment 14 a method for distributing map data to a device, the method comprising: generating, by a server, a blockchain including a smart contract for map data, wherein the smart contract includes a condition that a device be within a geographic boundary; receiving, by the server, a transaction including a hop count value and a latency value calculated from the device to a network node of a plurality of network nodes; receiving, by the server, a validation of the transaction by the plurality of network nodes storing the blockchain; determining, by the server, based on the hop count value and the latency value whether the device is within the geographic boundary; and transmitting, by the server, the map data to the device when the condition is true.

Embodiment 15 the method of embodiment 14, wherein the network node has an identified geospatial location.

Embodiment 16 the method of embodiment 14, wherein the latency value is an average latency value from the device to the network node.

Embodiment 17 a method for verifying a device requesting map data is within an approved geographic boundary, the method comprising: transmitting, by the device, a first plurality of messages to a network node; receiving, by the device, a second plurality of messages from the network node; calculating, by the device, a number of route hops from the device to the network node from the first plurality of messages and the second plurality of messages; calculating, by the device, a latency value for a round trip from the device to the network node from the first plurality of messages and the second plurality of messages; transmitting, by the device, a request for the map data including an identity of the network node, the number of route hops, and the latency value; and receiving, by the device, the map data when a location of the device is verified to be within the approved geographic boundary based on the identity of the network node, the number of route hops, and the latency value.

Embodiment 18 the method of embodiment 17, further comprising: identifying one or more network devices between the device and the network node; and transmitting with the request, the identified one or more network devices.

Embodiment 19 the method of embodiment 17, wherein the network node has an identified geospatial location.

Embodiment 20 the method of embodiment 17, wherein the request further includes an IP address for the device.

Embodiment 21 an apparatus being configured to perform and/or control the method of any of embodiments 1-8 and 14-20 or comprising means for performing and/or controlling the method of any of embodiments 1-8 and 14-20.

Embodiment 22 a computer program comprising instructions operable to cause a processor to perform and/or control the method of any of 1-8 and 14-20, when the computer program is executed on the processor.

I claim:

1. A method for verifying that a device requesting a map data update is within an approved geographic boundary, the method comprising:
   receiving, by a processor, a transaction request from the device for the map data update, the request including a first route hop count and a first latency value calculated from the device to a first network node and a second route hop count, and a second latency value calculated from the device to a second network node, the first network node located in a first location and the second network node located in a second location different than the first location;
   calculating a first threshold hop count and a first latency threshold for possible locations within the approved geographic boundary from the first location;
   calculating a second threshold hop count and a second latency threshold for possible locations within the approved geographic boundary from the second location;
   comparing, by the processor, the first route hop count to the first threshold hop count;
   comparing, by the processor, the first latency value to the first latency threshold;
   comparing, by the processor, the second route hop count to the second threshold hop count;
   comparing, by the processor, the second latency value to the second latency threshold;
   determining, by the processor, whether the device is within the approved geographic boundary as a function of a combination of each of the comparison of the first route hop count to the first threshold hop count, the comparison of the first latency value to the first latency threshold, the comparison of the second route hop count to the second threshold hop count, and the comparison of the second latency value to the second latency threshold;
   approving, by the processor, the transaction request; and
   transmitting, by the processor, the approval to a plurality of network nodes; and
   transmitting, by the processor, the map data update to the device when the transaction request is approved by the plurality of network nodes.

2. The method of claim 1, further comprising:
   determining, by the processor, whether the device has an active subscription for the map data updates, and transmitting the map data update only when the device has an active subscription.

3. The method of claim 1, wherein the transaction request further includes an IP address of the device; and wherein determining that the device is within the approved geographic boundary is further based on the IP address.

4. The method of claim 1, wherein the transaction request further includes positional data derived from a global positioning system (GPS) of the device; and wherein determining that the device is within the approved geographic boundary is further based on the positional data.

5. The method of claim 1, wherein the first threshold hop count is a minimum number of route hops from the first network node to a location outside the approved geographic boundary.

6. The method of claim 1, wherein when the device is determined to not be within the approved geographic boundary, the processor transmits a command to lock a mapping application on the device.

7. A system for verifying a device is within an approved geographic boundary, the system comprising:
   a geographic database configured to store map data;
   a receiving module configured to receive a transaction request from the device for a map data update, the request including a first route hop count and a first latency value calculated from the device to a first network node and a second rout hop count and a second latency value calculated from the device to a second network node;
   a threshold identification module configured to calculate a first threshold hop count and a first threshold latency value that correspond to the first network node and the approved geographic boundary and a second threshold hop count and a second threshold latency value that correspond to the second network node and the approved geographic boundary;
   a location verification module configured to verify as a function of a combination of the first route hop count, the first latency value, the first threshold hop count, the first threshold latency value, the second route hop count, the second latency value, the second threshold hop count, and the second threshold latency that the device is within the approved geographic boundary;
   a transmitting module configured to transmit the verification to a plurality of systems; the transmitting module configured to transmit the map data update to the device when the plurality of systems verify that the device is within the approved geographic boundary.

8. The system of claim 7, further comprising:
   a subscription module configured to check if the device has an active subscription for the map data update.

9. The system of claim 7, wherein the location verification module is further configured to determine that the device is within the approved geographic boundary based on an IP address for the device received by the receiving module.

10. The system of claim 7, wherein the first latency value is an average latency value from the device to the first network node.

11. The system of claim 7, wherein the location verification module is further configured to determine that the device is within the approved geographic boundary based on positional data derived from a global positioning system (GPS) of the device and received by the receiving module.

12. A method for distributing map data updates to a device, the method comprising:
   generating, by a server, on a blockchain an automatically executing smart contract for accessing map data updates, wherein the automatically executing smart contract includes a condition that a device must be within a geographic boundary for the automatically executing smart contract to be executed;
   receiving, by the server, a transaction request including a hop count value and a latency value calculated from the device to a network node of a plurality of network nodes;
   receiving, by the server, a validation of the transaction request by the plurality of network nodes storing the blockchain;
   determining, by the server, based on the hop count value and the latency value whether the device is within the geographic boundary;
   validating, by the server, the condition in the automatically executing smart contract;
   executing, automatically by the server once the condition is validated, the smart contract; and
   transmitting, by the server, the map data updates to the device when the condition is true.

13. The method of claim 12, wherein the network node has an identified geospatial location.

14. The method of claim 12, wherein the latency value is an average latency value from the device to the network node.

15. A method for verifying a device requesting map data is within an approved geographic boundary, the method comprising:
   transmitting, by the device, a first plurality of messages to a first network node;
   receiving, by the device, a second plurality of messages from the first network node;
   transmitting, by the device, a third plurality of messages to a second network node;
   receiving, by the device, a fourth plurality of messages from the second network node;
   calculating, by the device, a first number of route hops from the device to the first network node from the first plurality of messages and the second plurality of messages;
   calculating, by the device, a first latency value for a round trip from the device to the network node from the first plurality of messages and the second plurality of messages;
   calculating, by the device, a second number of route hops from the device to the second network node from the third plurality of messages and the fourth plurality of messages;
   calculating, by the device, a second latency value for a round trip from the device to the second network node from the third plurality of messages and the fourth plurality of messages;
   transmitting, by the device, a request for the map data including an identity of the first network node, an identity of the second network node, the first number of route hops, the first latency value, the second number of route hops, and the second latency value; and
   receiving, by the device, the map data when a location of the device is verified by a plurality of network nodes to be within the approved geographic boundary based on the identity of the network node, an identity of the second network node, the first number of route hops, the first latency value, the second number of route hops, and the second latency value.

16. The method of claim 15, further comprising:
   identifying one or more network devices between the device and the first network node; and
   transmitting with the request, the identified one or more network devices.

17. The method of claim 15, wherein the first network node has an identified geospatial location.

18. The method of claim 15, wherein the request further includes an IP address for the device.

* * * * *